United States Patent
Miyanaga

(10) Patent No.: US 10,154,157 B2
(45) Date of Patent: Dec. 11, 2018

(54) CALIBRATION SYSTEM THAT ENSURE IMPROVED ACCURACY WHILE REDUCING CALCULATION COST, CALIBRATION METHOD, AND RECORDING MEDIUM THEREFOR

(71) Applicant: KYOCERA Document Solutions Inc., Osaka (JP)

(72) Inventor: Yuka Miyanaga, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 6 days.

(21) Appl. No.: 15/660,005

(22) Filed: Jul. 26, 2017

(65) Prior Publication Data

US 2018/0034980 A1 Feb. 1, 2018

(30) Foreign Application Priority Data

Jul. 28, 2016 (JP) ................ 2016-149070

(51) Int. Cl.
H04N 1/00 (2006.01)
H04N 1/60 (2006.01)

(52) U.S. Cl.
CPC ..... H04N 1/00087 (2013.01); H04N 1/00015 (2013.01); H04N 1/00031 (2013.01);
(Continued)

(58) Field of Classification Search
None
See application file for complete search history.

(56) References Cited

U.S. PATENT DOCUMENTS

| 5,416,890 A * | 5/1995 | Beretta ............... G06F 3/04845 345/440 |
| 2002/0163657 A1* | 11/2002 | Bogdanowicz ...... H04N 1/6027 358/1.9 |

(Continued)

FOREIGN PATENT DOCUMENTS

| JP | 2011-61380 A | 3/2011 |
| JP | 2012-119799 A | 6/2012 |

*Primary Examiner* — Madelein T Nguyen
(74) *Attorney, Agent, or Firm* — Stein IP, LLC

(57) ABSTRACT

A calibration system includes an image forming apparatus, a color-measurement device, a primary-color-input-output-characteristics adjustment unit, and a secondary-color-input-output-characteristics adjustment unit. The primary-color-input-output-characteristics adjustment unit adjusts input-output characteristics of a primary color of the image forming apparatus by correcting a gamma correction table for the primary color. The secondary-color-input-output-characteristics adjustment unit adjusts input-output characteristics of a secondary color of the image forming apparatus by correcting the gamma correction table for the primary color using the measurement results of the chart for the secondary color. The chart for the secondary color is printed by the image forming apparatus after the adjustment. The secondary-color-input-output-characteristics adjustment unit, as a combination ratio of two color materials, obtains the combination ratio where a hue angle of the specific secondary color becomes a defined hue angle so as to correct the gamma correction table for the primary color corresponding to the obtained combination ratio.

5 Claims, 14 Drawing Sheets

(52) U.S. Cl.
CPC ....... *H04N 1/00045* (2013.01); *H04N 1/6038* (2013.01); *H04N 1/6044* (2013.01); H04N 1/00023 (2013.01); H04N 1/00053 (2013.01); H04N 1/00063 (2013.01)

(56) References Cited

U.S. PATENT DOCUMENTS

| | | | |
|---|---|---|---|
| 2004/0131371 A1* | 7/2004 | Itagaki | G03G 15/5041 399/49 |
| 2006/0164700 A1* | 7/2006 | Hayashi | H04N 1/6033 358/518 |
| 2009/0231645 A1* | 9/2009 | Hayashi | H04N 1/00002 358/520 |
| 2010/0157372 A1* | 6/2010 | Qiao | H04N 1/6022 358/3.01 |
| 2010/0157397 A1* | 6/2010 | Qiao | H04N 1/6022 358/518 |
| 2010/0158359 A1* | 6/2010 | Qiao | G06K 9/4652 382/164 |
| 2012/0133962 A1 | 5/2012 | Kondo | 358/1.9 |
| 2013/0063741 A1* | 3/2013 | Miyazaki | H04N 1/54 358/1.9 |

\* cited by examiner

| Character | Notation |
|---|---|
| 0 |  |
| 1 |  |
| 2 |  |
| 3 |  |
| 4 |  |
| 5 |  |
| 6 |  |
| 7 |  |
| 8 |  |
| 9 |  |
| . |  |

CALIBRATION SYSTEM THAT ENSURE IMPROVED ACCURACY WHILE REDUCING CALCULATION COST, CALIBRATION METHOD, AND RECORDING MEDIUM THEREFOR

INCORPORATION BY REFERENCE

This application is based upon, and claims the benefit of priority from, corresponding Japanese Patent Application No. 2016-149070 filed in the Japan Patent Office on Jul. 28, 2016, the entire contents of which are incorporated herein by reference.

BACKGROUND

Unless otherwise indicated herein, the description in this section is not prior art to the claims in this application and is not admitted to be prior art by inclusion in this section.

A typical image forming apparatus uses a color conversion table to convert input color values into output color values. A color conversion table for a primary color is constituted of a gamma correction table for each color material such as toner or ink, which is used for printing by an image forming apparatus. A color conversion table for a secondary (or more) color is formed based on gamma correction tables for a plurality of color materials.

Holding input-output characteristics of a primary color in each color material in accordance with a defined value holds colors reproduced by an image forming apparatus in constant state. However, input-output characteristics of a primary color changes due to, for example, a secular change. Thus, there is known a technique that adjusts input-output characteristics of a primary color to approach the defined value, by correcting the gamma correction table.

However, adjusting input-output characteristics of a primary color does not mean adjusting a balance of a whole region of an output color space. Consequently, even when input-output characteristics of a primary color is adjusted, in the case of a color of a secondary (or more) color, the color after having undergone a color conversion table sometimes has a problem of a collapsed balance of a plurality of primary colors, which constitute this color. This sometimes results in that the color does not necessarily match the defined color value and has a significant difference from a color in user's recognition.

Thus, as a method that reduces a difference between a color in user's recognition and an actually printed color, there is known an adjustment method that considers a whole region of a color space.

There is proposed an adjustment method that individually corrects each of a primary color and a secondary color. Then, the method obtains a correction value to correct a whole, by combining correction values obtained during correction.

There is also proposed an adjustment method that corrects a primary color and then sequentially corrects a secondary color and a tertiary color. The method attaches a weight to the primary color based on the obtained values.

SUMMARY

A calibration system according to one aspect of the disclosure includes an image forming apparatus, a color-measurement device, a primary-color-input-output-characteristics adjustment unit, and a secondary-color-input-output-characteristics adjustment unit. The image forming apparatus prints using a gamma correction table. The color-measurement device measures colors on a chart printed by the image forming apparatus. The primary-color-input-output-characteristics adjustment unit adjusts input-output characteristics of a primary color of the image forming apparatus by correcting the gamma correction table for the primary color using measurement results of the chart for the primary color. The measurement results is measured by the color-measurement device. The secondary-color-input-output-characteristics adjustment unit adjusts input-output characteristics of a secondary color of the image forming apparatus by correcting the gamma correction table for the primary color using the measurement results of the chart for the secondary color. The measurement results are measured by the color-measurement device. The chart for the secondary color is printed by the image forming apparatus after the adjustment of the input-output characteristics of the primary color by the primary-color-input-output-characteristics adjustment unit. The secondary-color-input-output-characteristics adjustment unit, as a combination ratio of two color materials that constitute a specific secondary color, obtains the combination ratio where a hue angle of the specific secondary color becomes a defined hue angle so as to correct the gamma correction table for the primary color corresponding to the obtained combination ratio.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
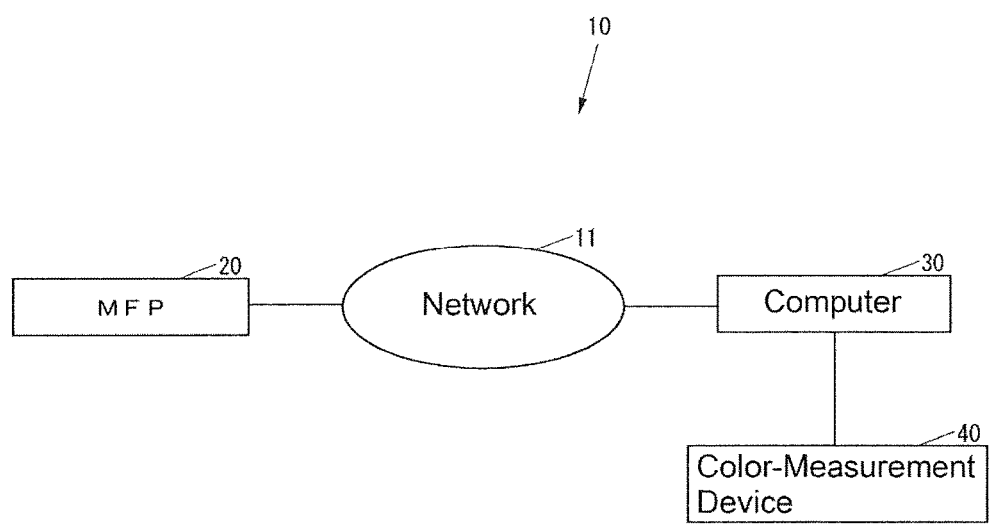
FIG. 1 illustrates a block diagram of a calibration system according to one embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes one embodiment of the disclosure with reference to the drawings.

First, a description will be given of a configuration of a calibration system according to the embodiment.

FIG. 1 illustrates a block diagram of a calibration system 10.

As illustrated in FIG. 1, the calibration system 10 includes: a Multifunction Peripheral (MFP) 20 as an image forming apparatus; a computer 30, such as a Personal Computer (PC), for adjusting a gamma correction table of the MFP 20; and a color-measurement device 40, such as a scanner or a colorimeter, for measuring a color on a recording medium printed by the MFP 20.

The MFP 20 and the computer 30 are communicable with one another via a network 11 such as a Local Area Network (LAN) or the Internet. The MFP 20 and the computer 30 may be directly communicable with one another by wired or wireless connection without using the network 11.

The computer 30 and the color-measurement device 40 are directly communicable with one another by wired or wireless connection without using the network 11. The computer 30 and the color-measurement device 40 may be communicable with one another via the network 11.

Figure 2:
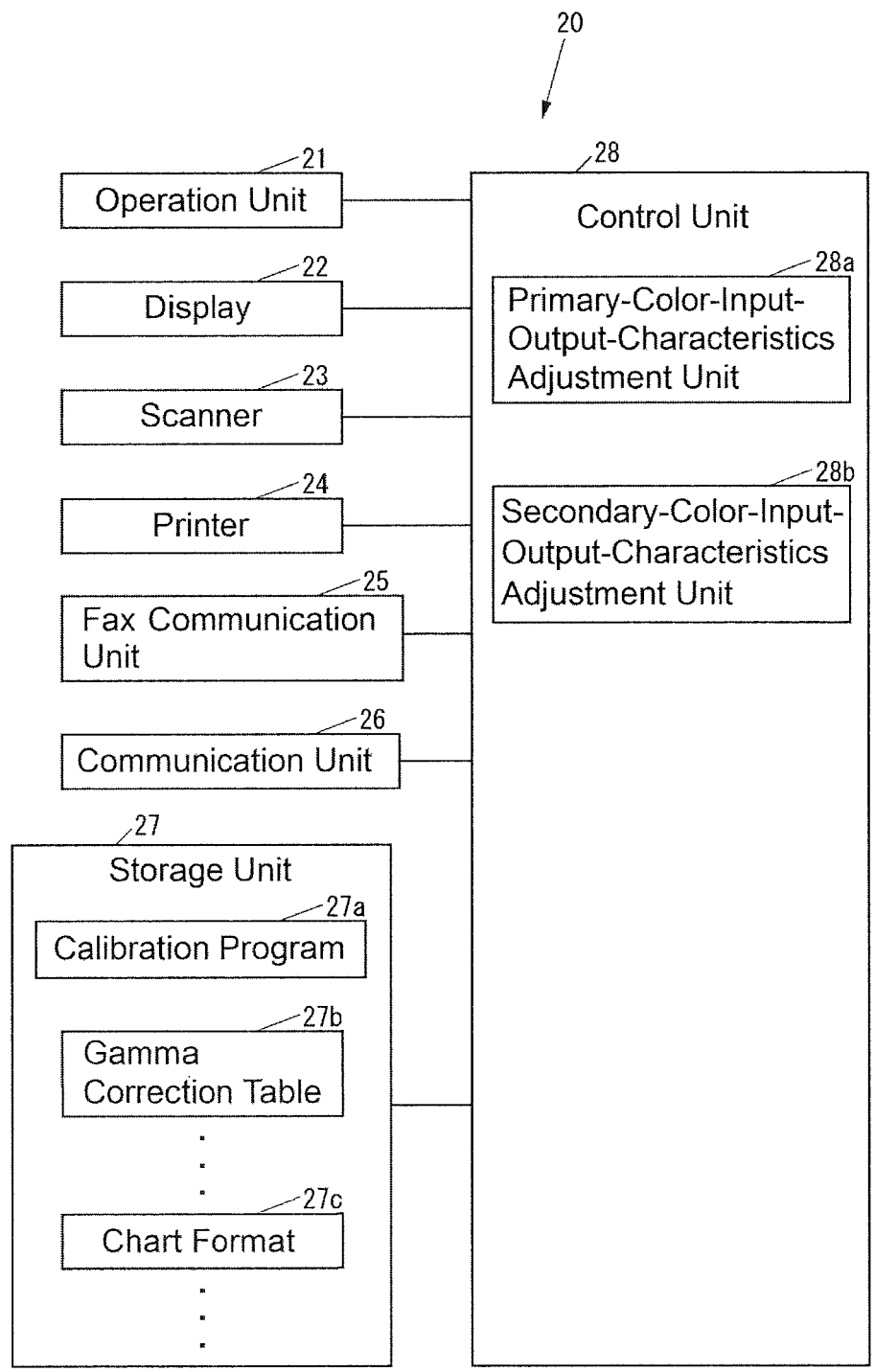
FIG. 2 illustrates a block diagram of an MFP according to the one embodiment.

FIG. 2 illustrates a block diagram of the MFP 20.

As illustrated in FIG. 2, the MFP 20 includes an operation unit 21, a display 22, a scanner 23, a printer 24, a fax communication unit 25, a communication unit 26, a storage unit 27, and a control unit 28. The operation unit 21 is an operation device such as a button to which various operations are input. The display 22 is a display device such as a Liquid Crystal Display (LCD) that displays various pieces of information. The scanner 23 is a reading device for reading an image from a document. The printer 24 is a print device for performing printing on a recording medium such as a paper sheet. The fax communication unit 25 is a fax device that performs fax communications with an external facsimile device (not illustrated) via a communication line such as a dial-up line. The communication unit 26 is a communication device that directly communicates with an external device via wired or wireless connection without the network 11 (see FIG. 1) or communicates with an external device via the network 11. The storage unit 27, which is a non-volatile storage device such as a semiconductor memory and a Hard Disk Drive (HDD), stores various pieces of data. The control unit 28 controls the entire MFP 20.

The storage unit 27 stores a calibration program 27a for adjusting input-output characteristics of the MFP 20. The calibration program 27a may be installed into the MFP 20 at production stage of the MFP 20, may be additionally installed into the MFP 20 from a storage medium such as an SD card or a Universal Serial Bus (USB) memory, or may be additionally installed into the MFP 20 from the network 11.

The storage unit 27 stores a gamma correction table 27b for each of color materials of cyan, magenta, yellow, and black.

The storage unit 27 stores a chart format 27c that indicates a format of a chart used for calibration, for each type of chart. The chart format 27c includes information that a patch relative to which input color value is arranged at which position, as the patch for adjustment. The chart includes: a chart that includes all the colors of the color materials of primary colors, namely, cyan, magenta, yellow, and black (hereinafter referred to as "a primary-color chart;" and a chart for a secondary color, namely, for each color constituted of any two color materials among the color materials of cyan, magenta, and yellow (hereinafter referred to as "a secondary-color chart."

The control unit 28 includes, for example, a Central Processing Unit (CPU), a Read Only Memory (ROM), and a Random Access Memory (RAM). The ROM stores programs and various kinds of data. The RAM is used as a work area of the CPU of the control unit 28. The CPU of the control unit 28 executes the programs stored in the ROM of the control unit 28 or the storage unit 27.

The control unit 28 ensures a primary-color-input-output-characteristics adjustment unit 28a and a secondary-color-input-output-characteristics adjustment unit 28b by executing the calibration program 27a stored in the storage unit 27. The primary-color-input-output-characteristics adjustment unit 28a adjusts the input-output characteristics of the primary color of the MFP 20 by correcting the gamma correction table 27b using the measurement results of the primary-color chart measured by the color-measurement device 40 (see FIG. 1). The secondary-color-input-output-characteristics adjustment unit 28b adjusts the input-output characteristics of the secondary color of the MFP 20 by correcting the gamma correction table 27b using the measurement results of the secondary-color chart, which has been printed by the MFP 20 after adjustment of the input-output characteristics of the primary color by the primary-color-input-output-characteristics adjustment unit 28a, measured by the color-measurement device 40.

Figure 3:
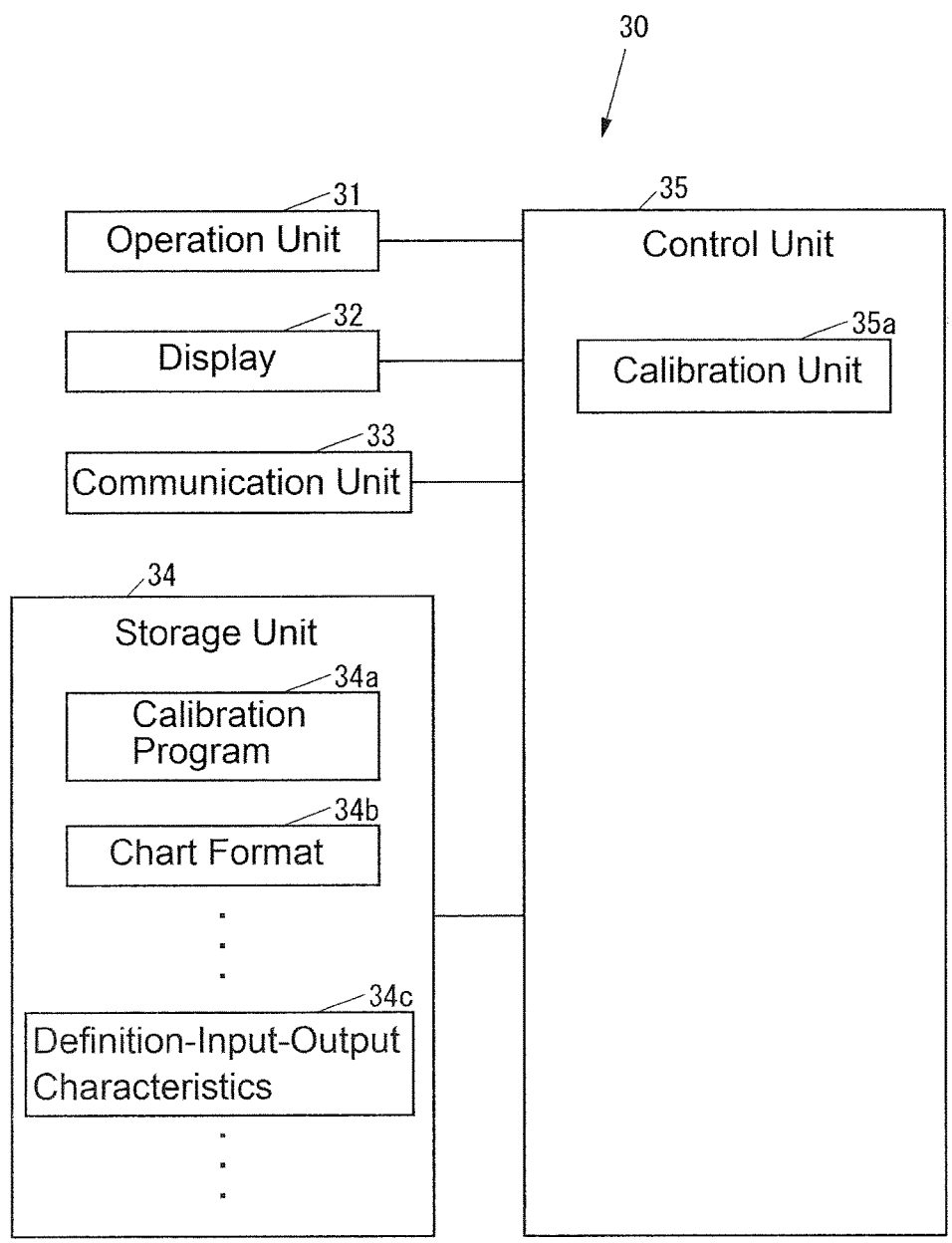
FIG. 3 illustrates a block diagram of a computer according to the one embodiment.

FIG. 3 illustrates a block diagram of the computer 30.

As illustrated in FIG. 3, the computer 30 includes an operation unit 31, a display 32, a communication unit 33, a storage unit 34, and a control unit 35. The operation unit 31 is an operation device such as a keyboard and a computer mouse to which various operations are input. The display 32 is a display device such as an LCD that displays various pieces of information. The communication unit 33 is a communication device that directly communicates with an external device via wired or wireless connection without the network 11 or communicates with an external device via the network 11. The storage unit 34, which is a non-volatile storage device such as a semiconductor memory and an HDD, stores various pieces of data. The control unit 35 controls the entire computer 30.

The storage unit 34 stores a calibration program 34a for adjusting input-output characteristics of the MFP 20 (see FIG. 1). The calibration program 34a may be installed into the computer 30 at production stage of the computer 30, may be additionally installed from a storage medium such as a USB memory, a Compact Disk (CD), and a Digital Versatile Disk (DVD) into the computer 30, or may be additionally installed from the network 11 into the computer 30.

The storage unit 34 stores a chart format 34b that indicates a format of a chart used for calibration, for each type of chart. The chart format 34b includes information that a patch relative to which input color value is arranged at which position, as the patch for adjustment. The chart includes the primary-color chart and the secondary-color chart.

The storage unit 34 stores definition-input-output characteristics 34c that indicate the input-output characteristics of the primary color defined with respect to the MFP 20, for each primary color.

The control unit 35 includes, for example, a Central Processing Unit (CPU), a Read Only Memory (ROM), and a Random Access Memory (RAM). The ROM stores programs and various kinds of data. The RAM is used as a work area of the CPU of the control unit 35. The CPU of the control unit 35 executes the programs stored in the ROM of the control unit 35 or the storage unit 34.

The control unit 35 ensures a calibration unit 35a that adjusts the input-output characteristics of the MFP 20 by executing the calibration program 34a stored in the storage unit 34.

Next, a description will be given of a calibration method with use of the calibration system 10.

Figure 4:
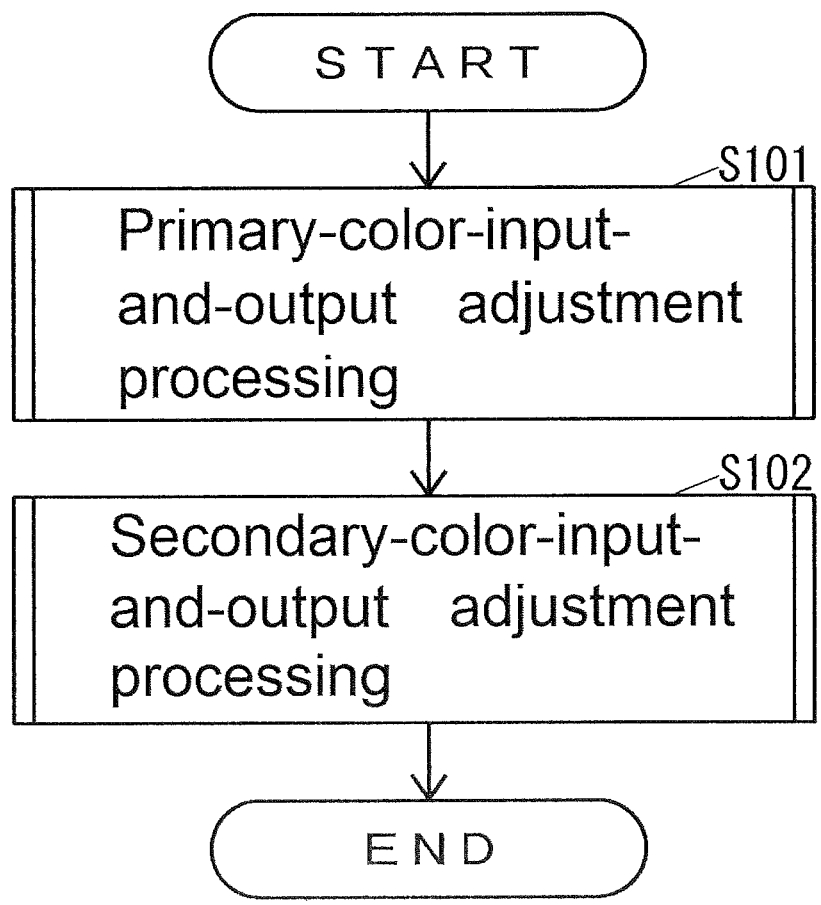
FIG. 4 illustrates operations of the MFP according to the one embodiment when executing calibration.

FIG. 4 illustrates operations of the MFP 20 when executing the calibration.

As illustrated in FIG. 4, the primary-color-input-output-characteristics adjustment unit 28a executes primary-color-input-and-output adjustment processing that adjusts the input-output characteristics of each color of the color materials of cyan, magenta, yellow, and black, namely the primary color, which are used in the printer 24 (Step S101).

Subsequently, the secondary-color-input-output-characteristics adjustment unit 28b executes secondary-color-input-and-output adjustment processing that adjusts the input-output characteristics of a color constituted of any two color materials among the color materials of cyan, magenta, and yellow, namely, the secondary color (Step S102) and then terminates the operations illustrated in FIG. 4.

Figure 5:
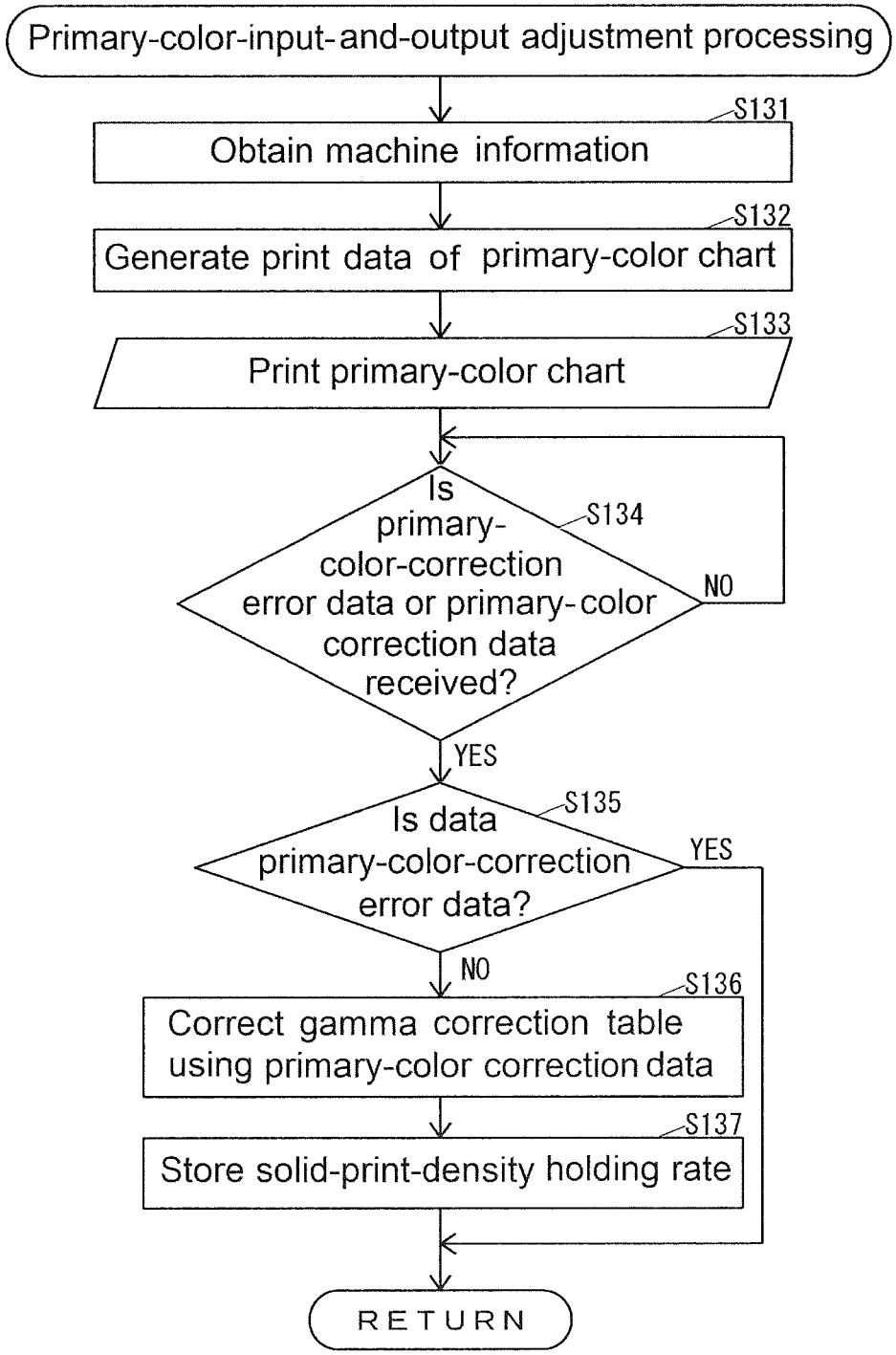
FIG. 5 illustrates primary-color-input-and-output adjustment processing according to the one embodiment.

FIG. 5 illustrates the primary-color-input-and-output adjustment processing illustrated in FIG. 4.

As illustrated in FIG. 5, first, the primary-color-input-output-characteristics adjustment unit 28a obtains machine information such as an Internet Protocol (IP) address of the MFP 20, which is necessary for the computer 30 to access the MFP 20, from, for example, the storage unit 27 (Step S131).

Subsequently, the primary-color-input-output-characteristics adjustment unit 28a generates print data for the primary-color chart based on the chart format 27c (Step S132).

Figure 6:
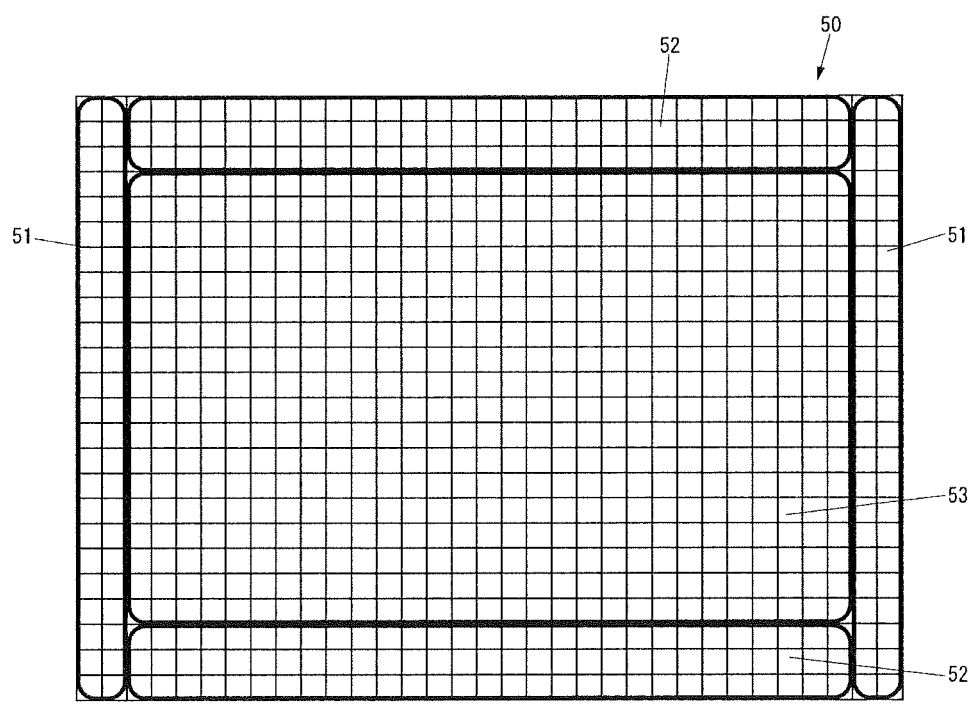
FIG. 6 illustrates one example of one page's worth of a primary-color chart printed in the operation illustrated in FIG. 5.

FIG. 6 illustrates one example of one page's worth of a primary-color chart 50.

As illustrated in FIG. 6, each page of the primary-color chart 50 is constituted of cells of 24 vertical×33 horizontal cells, namely, 24 rows and 33 columns.

Figure 7:
FIG. 7 illustrates a notation method of information in the primary-color chart according to the one embodiment.
Figure 7:
Figure 7:
Figure 7:
Figure 7:
Figure 7:
Figure 7:
Figure 7:
Figure 7:
Figure 7:
Figure 7:

Each page of the primary-color chart 50 includes chart-specific-information regions 51 where chart specific information to specify the primary-color chart 50 is described. The chart-specific-information region 51 is the two-column portion (a portion of 24 vertical×2 horizontal cells) in each of the right and left portions, in each page of the primary-color chart 50. The chart specific information includes a kind indicative of which primary-color chart, a page number indicative of which page among the pages in the primary-color chart 50, and a page direction of the page. As illustrated in FIG. 7, each portion constituted of 3 vertical×2 horizontal cells can denote a character one by one, and thus the chart-specific-information regions 51 in each page of the primary-color chart 50 can include total 16 characters of eight characters in the left-side-two-column portion and eight characters in the right-side-two-column portion. Although only total 11 kinds of characters of, as described later, numerals from 0 to 9 and period can be used in the chart-specific-information regions 51 in each page of the primary-color chart 50, a commonly recognized correspondence relationship between character strings described in the chart-specific-information region 51 and contents of the information that the character strings actually mean between the MFP 20 and the computer 30 enables transmitting considerably much information.

FIG. 7 illustrates a notation method of the information in the primary-color chart 50.

As illustrated in FIG. 7, in the primary-color chart 50, the portion of 3 vertical×2 horizontal cells ensures denoting any of the total 11 kinds of characters of numerals from 0 to 9 and period by printing which cell among the cells of the portion. For notation of the information in the primary-color chart 50, for example, a solid black is employable.

As illustrated in FIG. 6, each page of the primary-color chart 50 includes machine-information regions 52 where the machine information obtained at Step S131 is described. The machine-information region 52 is the three-row portion (a portion of 3 vertical×29 horizontal cells) on each of the top and bottom sides in each page of the primary-color chart 50. As illustrated in FIG. 7, since each portion of 3 vertical×2 horizontal cells can denote a character one by one, the machine-information regions 52 of each page of the primary-color chart 50 can include the total 28 characters of 14 characters in the three-row portion on the top side and 14 characters in the three-row portion on the bottom side. In the machine-information regions 52, three cells worth of the portion of 3 vertical×1 horizontal cells are not used at each of the three-row portion on the top side and the three-row portion on the bottom side. Although only total 11 kinds of characters of, as described above, the numerals from 0 to 9 and period can be used in the machine-information regions 52 of each page of the primary-color chart 50, a commonly recognized correspondence relationship between a character string described in the machine-information regions 52 and contents of the information that the character strings actually mean between the MFP 20 and the computer 30 enables transmitting considerably much information.

Each page of the primary-color chart 50 includes an adjustment-patch region 53 that indicates the patch for adjustment by one cell. The adjustment-patch region 53 is the portion of 18 vertical×29 horizontal cells at the center in each page of the primary-color chart 50. That is, each page of the primary-color chart 50 can include 522 patches. For example, when six times worth of 65 tones of each color of cyan, magenta, yellow, and black are arranged with random number to be used as the primary-color chart 50, the primary-color chart 50 needs 1560 patches. As described above, since one page can include 522 patches, the primary-color chart 50 needs to be constituted of three or more pages.

Although it is preferred that the patches be arranged with random number because of being insusceptible to an influence of a print position to a recording medium by the printer 24, the patches do not have to be arranged with random number. Although it is preferred that the patches be arranged in multiple times worth because of being insusceptible to various influences, the patches do not have to be arranged in multiple times worth.

As illustrated in FIG. 5, after the process at Step S132, the primary-color-input-output-characteristics adjustment unit 28a prints the primary-color chart with the printer 24 based on the print data generated at Step S132 (Step S133).

When the primary-color chart is printed at Step S133, a user causes the color-measurement device 40 to measure the respective colors in the plurality of patches, which are included in the primary-color chart printed at Step S133.

Figure 8:
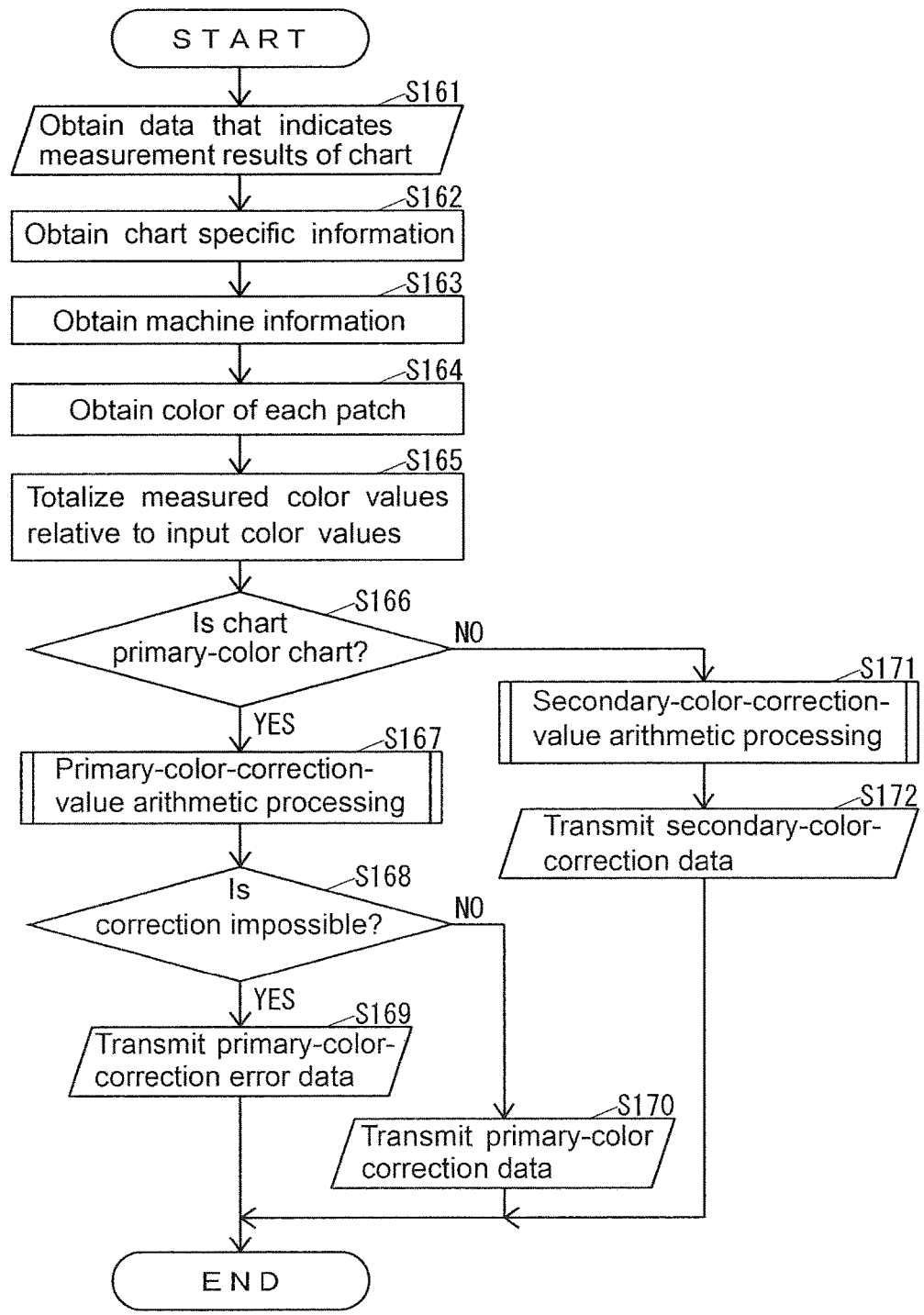
FIG. 8 illustrates operations of the computer according to the one embodiment.

FIG. 8 illustrates operations of the computer 30.

As illustrated in FIG. 8, the calibration unit 35a obtains data that indicates measurement results of the chart from the color-measurement device 40 (Step S161).

Subsequently, the calibration unit 35a obtains the chart specific information from the data obtained at Step S161 (Step S162).

Next, the calibration unit 35a obtains the machine information from the data obtained at Step S161, based on the information of the kind of chart and the direction of the page, which are included in the chart specific information obtained at Step S162, and the chart format 34b (Step S163).

Subsequently, the calibration unit 35a obtains the color of each patch in the adjustment-patch region from the data obtained at Step S161, based on the information of the kind of chart, the page number, and the direction of the page, which are included in the chart specific information obtained at Step S162, and the chart format 34b (Step S164). Then, the calibration unit 35a totalizes the measured color values relative to the input color values for each input color value, based on the obtained color of each patch, the kind of chart included in the chart specific information obtained at Step S162, and the chart format 34b (Step S165). Here, for the measured color values relative to an identical input color value, it is only necessary that the calibration unit 35a obtains, for example, an average value.

After the process at Step S165, the calibration unit 35a determines whether the chart is the primary-color chart or not, based on the kind of chart included in the chart specific information obtained at Step S162 (Step S166).

When the calibration unit 35a determines that the chart is the primary-color chart at Step S166, the calibration unit 35a executes primary-color-correction-value arithmetic processing that operates a correction value for correcting the input-output characteristics of the primary color (Step S167).

Figure 9:
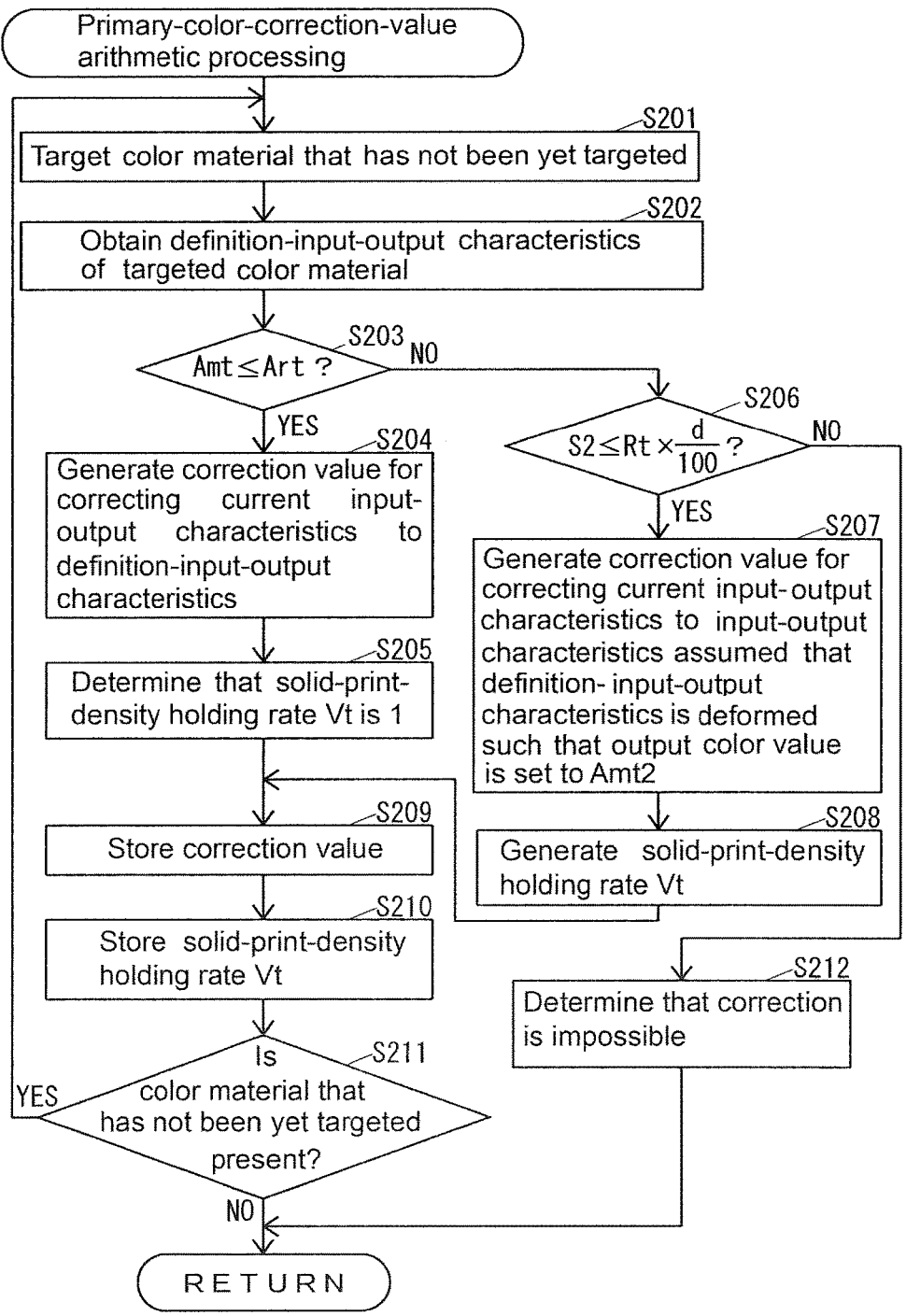
FIG. 9 illustrates primary-color-correction-value arithmetic processing according to the one embodiment.

FIG. 9 illustrates the primary-color-correction-value arithmetic processing illustrated in FIG. 8.

As illustrated in FIG. 9, the calibration unit 35a targets the color material that has not been yet targeted among cyan, magenta, yellow, and black (Step S201).

Subsequently, the calibration unit 35a obtains the definition-input-output characteristics 34c of the targeted color material (Step S202).

Figure 10:
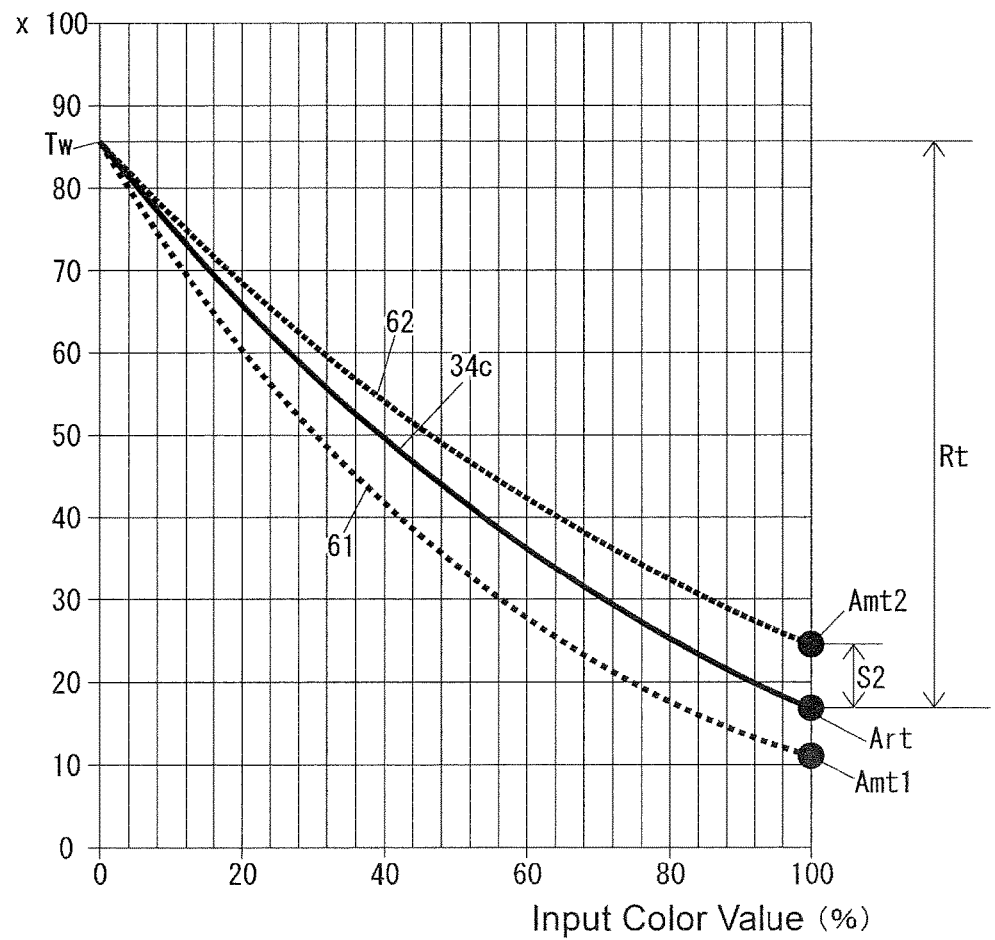
FIG. 10 illustrates one example of definition-input-output characteristics and measured color values according to the one embodiment, of cyan.

FIG. 10 illustrates one example of the definition-input-output characteristics 34c and the measured color values of cyan.

In FIG. 10, it is ideal that the input-output characteristics obtained from the measured color values are identical to the definition-input-output characteristics 34c. However, the actual input-output characteristics, such as the input-output characteristics 61, sometimes has the print density darker than that of the definition-input-output characteristics 34c, namely X values in an XYZ space are low, or the actual input-output characteristics, such as the input-output characteristics 62, sometimes has the print density lighter than that of the definition-input-output characteristics 34c, namely the X values in the XYZ space are high.

For cyan, a range of the tones of the output color values relative to 0% to 100% input color values are broadest in the X value in the XYZ space. Consequently, in FIG. 10 that illustrates the definition-input-output characteristics 34c of cyan, the X values are used as values that indicate the print density when printed. Regarding the color material other than cyan also, it is preferred that values where the range of the tones of the output color values relative to 0% to 100% input color values are broadest be used as the values that indicate the print density when printed among the X value, the Y value, and the Z value in the XYZ space. For example, for magenta and black, it is preferred that the Y values in the XYZ space be used as the values that indicate the print density when printed. For yellow, it is preferred that the Z values in the XYZ space be used as the values that indicate the print density when printed.

As illustrated in FIG. 9, after the process at Step S202, the calibration unit 35a determines whether a measured color value Amt relative to the input color value 100% is equal to or less than an output color value Art in the definition-input-output characteristics 34c relative to the input color value 100% or not (Step S203).

When a measured color value Amt1 relative to the input color value 100% is equal to or less than the output color value Art as in the input-output characteristics 61 in FIG. 10, the print density of the input-output characteristics obtained from the measured color value is dark compared with the definition-input-output characteristics 34c, namely the amount of the color material printed on the recording medium is large. Thus, reducing the input color value from the current input color value during printing or similar method enables the print density in the measured color value at the input color value 100% (hereinafter referred to as "a solid print density of a measured color value") to match the print density in the definition-input-output characteristics 34c at the input color value 100% (hereinafter referred to as "a defined solid print density") to cause the input-output characteristics of the measured color value to approach the definition-input-output characteristics 34c. Consequently, when the calibration unit 35a determines that the measured color value Amt is equal to or less than the output color value Art; namely, the solid print density of the measured color value is determined to be equal to or more than the defined solid print density at Step S203, the calibration unit 35a generates a correction value for correcting the input-output characteristics obtained from the measured color value to the definition-input-output characteristics 34c (Step S204), and determines that a ratio of the solid print density of the measured color value to the defined solid print density, namely, a solid-print-density holding rate Vt is 1 (Step S205).

When a measured color value Amt2 relative to the input color value 100% is larger than the output color value Art as in the input-output characteristics 62 in FIG. 10, the print density of the input-output characteristics obtained from the measured color value is light compared with the definition-input-output characteristics 34c, namely the amount of the color material printed on the recording medium is small. Thus, since the solid print density of the measured color value cannot be made darker than the current print density, it is impossible to match the solid print density of the measured color value to the defined solid print density. Consequently, when the calibration unit 35a determines that the measured color value Amt is larger than the output color value Art; namely, the solid print density of the measured color value is determined to be larger than the defined solid print density at Step S203, the calibration unit 35a determines whether a difference S2 between the measured color value Amt2 relative to the input color value 100% and the output color value Art in the definition-input-output characteristics 34c relative to the input color value 100% (namely, Amt2−Art) is equal to or less than d % of a difference Rt between an output color value Tw in the definition-input-output characteristics 34c relative to the input color value 0% and the output color value Art in the definition-input-output characteristics 34c relative to the input color value 100% (namely, Tw−Art) or not (Step S206).

Here, in the case of the color materials other than black, namely, the color materials of cyan, magenta, and yellow, d % is, for example, 7% and, in the case of the color material of black, d % is, for example, 5%. Both 5% of the color material of black and 7% of the color materials other than black have similar color difference ΔE when expressed in a Lab color space.

When the calibration unit 35a determines that the difference S2 is equal to or less than Rt×d/100 at Step S206, the calibration unit 35a generates the correction value for correcting the input-output characteristics obtained from the measured color value to the input-output characteristics assuming that the output color value relative to the input color value 0% is kept at Tw while the definition-input-output characteristics 34c is deformed such that the output color value relative to the input color value 100% is set from Art to Amt2 (Step S207), and then generates a solid-print-density holding rate Vt, namely, {(Tw−Amt2)/(Tw−Art)} (Step S208).

The calibration unit 35a stores the correction value generated at Step S204 or Step S207 in the storage unit 34 as the correction value for the gamma correction table 27b of the targeted color material (Step S209), and stores the solid-print-density holding rate Vt, which has been determined at Step S205, or generated at Step S208, in the storage unit 34 as the solid-print-density holding rate Vt of the gamma correction table 27b of the targeted color material (Step S210).

Subsequently, the calibration unit 35a determines whether the color material that has not been yet targeted is present among cyan, magenta, yellow, and black or not (Step S211).

When the calibration unit 35a that determines that the color material that has not been yet targeted is present at Step S211, the calibration unit 35a executes the process at Step S201.

On the other hand, when the calibration unit 35a determines that the color material that has not been yet targeted is absent at Step S211, the calibration unit 35a terminates the operations illustrated in FIG. 9.

When the difference S2 is larger than Rt×d/100, the solid print density of the measured color value is excessively light, and thus, correcting the gamma correction table 27b is inappropriate. Consequently, when the calibration unit 35a determines that the difference S2 is larger than Rt×d/100 at Step S206, the calibration unit 35a determines that correction is impossible (Step S212) and terminates the operations illustrated in FIG. 9.

As illustrated in FIG. 8, after executing the primary-color-correction-value arithmetic processing at Step S167, the calibration unit 35a determines whether the correction is determined to be impossible at Step S212 or not (Step S168).

When the calibration unit 35a determines that the correction is determined to be impossible at Step S212, at Step S168, the calibration unit 35a transmits primary-color-correction error data indicating that the correction is impossible to the MFP 20 specified by the machine information obtained at Step S163 (Step S169) and terminates the operations illustrated in FIG. 8.

When the calibration unit 35a determines that the correction is not determined to be impossible at Step S212, at Step S168, the calibration unit 35a transmits primary-color correction data to the MFP 20 specified by the machine information obtained at Step S163 (Step S170), and the calibration unit 35a terminates the operations illustrated in FIG. 8. The primary-color correction data indicates the correction value stored in the storage unit 34 at Step S209 and the solid-print-density holding rate Vt stored in the storage unit 34 at Step S210, for each of cyan, magenta, yellow, and black.

As illustrated in FIG. 5, after the process at Step S133, the primary-color-input-output-characteristics adjustment unit 28a determines whether the primary-color-correction error data or the primary-color correction data is received or not until determining that the primary-color-correction error data or the primary-color correction data is received (Step S134).

When determining that the primary-color-correction error data or the primary-color correction data is received at Step S134, the primary-color-input-output-characteristics adjustment unit 28a determines whether the data determined to be received at Step S134 is the primary-color-correction error data or not (Step S135).

When determining that the data determined to be received at Step S134 is the primary-color-correction error data at Step S135, the primary-color-input-output-characteristics adjustment unit 28a terminates the operations illustrated in FIG. 5.

When determining that the data determined to be received at Step S134 is not the primary-color-correction error data at Step S135, the primary-color-input-output-characteristics adjustment unit 28a corrects the gamma correction tables 27b of all the color materials, by applying the correction value included in the primary-color correction data, which is determined to be received at Step S134, to the current gamma correction table 27b for each color material (Step S136), and the primary-color-input-output-characteristics adjustment unit 28a stores the solid-print-density holding rate Vt for each color material, which is included in the primary-color correction data determined to be received at Step S134, in the storage unit 27 (Step S137) and terminates the operations illustrated in FIG. 5.

Figure 11:
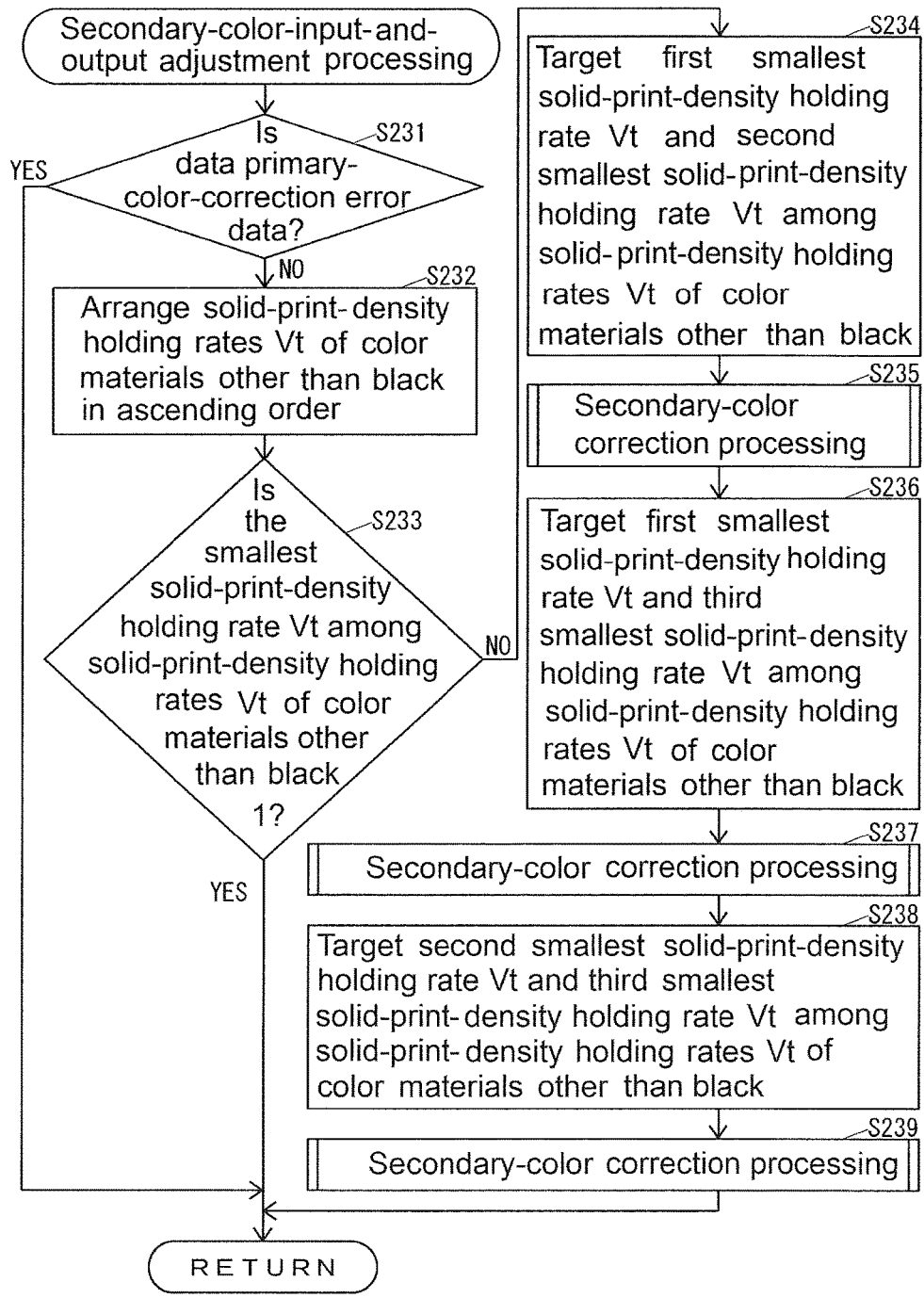
FIG. 11 illustrates secondary-color-input-and-output adjustment processing according to the one embodiment.

FIG. 11 illustrates the secondary-color-input-and-output adjustment processing illustrated in FIG. 4.

As illustrated in FIG. 11, the secondary-color-input-output-characteristics adjustment unit 28b determines whether the data determined to be received at Step S134 is the primary-color-correction error data or not (Step S231).

When determining that the data determined to be received at Step S134 is the primary-color-correction error data at Step S231, the secondary-color-input-output-characteristics adjustment unit 28b terminates the operations illustrated in FIG. 11.

When determining that the data determined to be received at Step S134 is not the primary-color-correction error data at Step S231, the secondary-color-input-output-characteristics adjustment unit 28b arranges the solid-print-density holding rates Vt of the color materials other than black among the solid-print-density holding rates Vt included in the primary-color correction data determined to be received at Step S134 in ascending order (Step S232).

Subsequently, the secondary-color-input-output-characteristics adjustment unit 28b determines whether the smallest solid-print-density holding rate Vt among the solid-print-density holding rates Vt of the color materials other than black, namely, the first solid-print-density holding rate Vt from the beginning in the order arranged at Step S232 is 1 or not (Step S233).

That the smallest solid-print-density holding rate Vt among the solid-print-density holding rates Vt of the color materials other than black is 1 means that the solid-print-density holding rates Vt of the color materials other than black are all 1. That is, this means that the input-output characteristics for all the color materials other than black are corrected to the definition-input-output characteristics 34c. When the input-output characteristics for all the color materials other than black are corrected to the definition-input-output characteristics 34c, the secondary colors also become as defined, and adjustment of the input-output characteristics is unnecessary. Consequently, when determining that the smallest solid-print-density holding rate Vt among the solid-print-density holding rates Vt of the color materials other than black is 1 at Step S233, the secondary-color-input-output-characteristics adjustment unit 28b terminates the operations illustrated in FIG. 11.

When determining that the smallest solid-print-density holding rate Vt among the solid-print-density holding rates Vt of the color materials other than black is not 1 at Step S233, the secondary-color-input-output-characteristics adjustment unit 28b selects the color materials that corresponds to the first smallest solid-print-density holding rate Vt among the solid-print-density holding rates Vt of the color materials other than black, namely, the first solid-print-density holding rate Vt from the beginning in the order arranged at Step S232 and the second smallest solid-print-density holding rate Vt, namely, the second solid-print-density holding rate Vt from the beginning in the order arranged at Step S232 (Step S234), and executes secondary-color correction processing that corrects the input-output characteristics of the secondary color constituted of the two color materials selected at Step S234 (Step S235).

Figure 12:
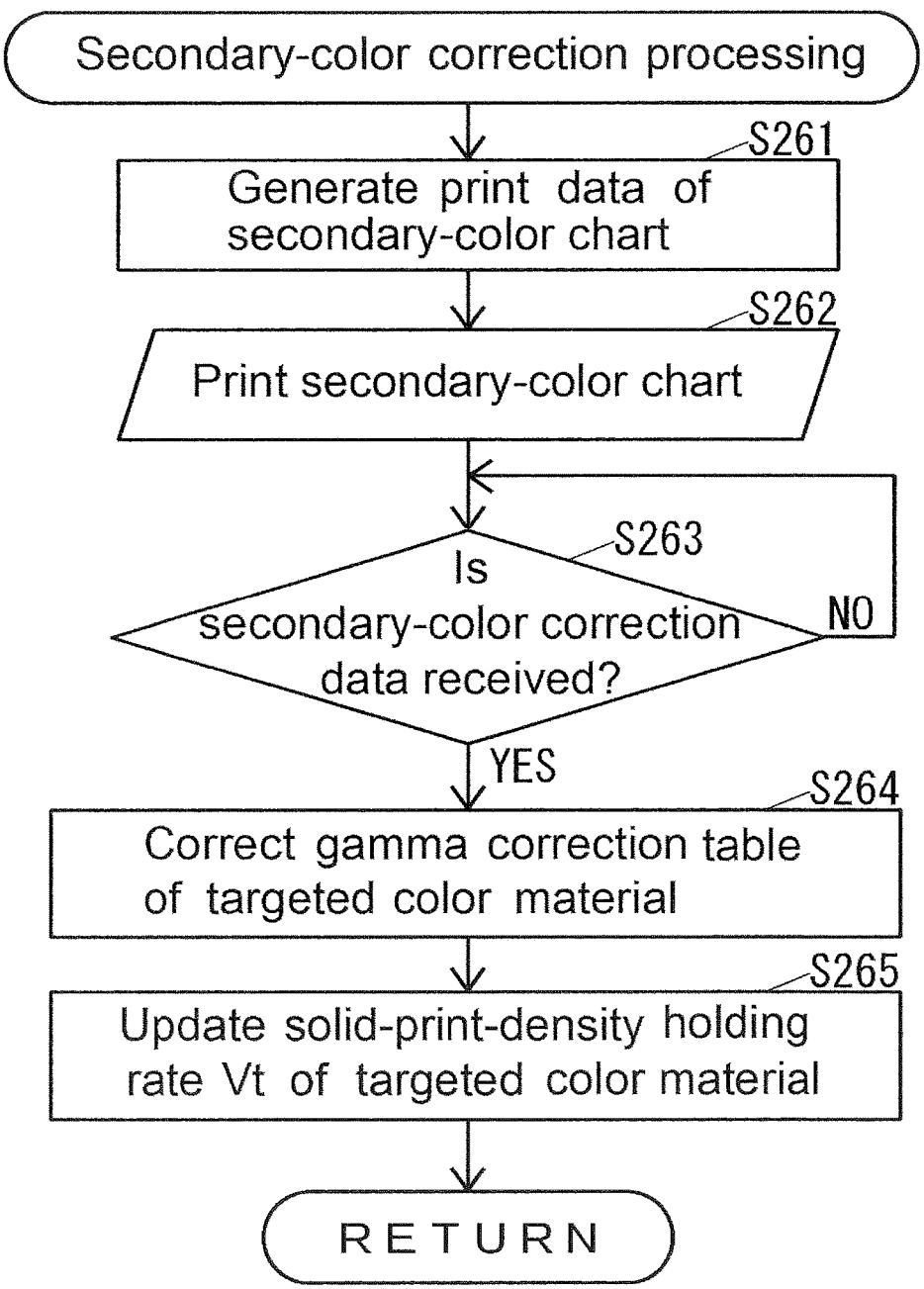
FIG. 12 illustrates secondary-color correction processing according to the one embodiment.

FIG. 12 illustrates the secondary-color correction processing illustrated in FIG. 11.

As illustrated in FIG. 12, the secondary-color-input-output-characteristics adjustment unit 28b generates print data of the secondary-color chart based on the chart format 27c (Step S261).

Here, the secondary-color chart has a configuration similar to the primary-color chart 50 illustrated in FIG. 6, for example, the machine information obtained at Step S131 being described in the machine-information region, except the configuration that will be described below. The chart-specific-information region of the secondary-color chart includes the information indicating that the secondary-color chart is a combination of which primary colors, not the information indicating that which primary-color chart is. The chart-specific-information region of the secondary-color chart can include a combination ratio, which will be described later. The patches included in the adjustment-patch region of the secondary-color chart are different from the patches included in the adjustment-patch region of the primary-color chart.

Figure 13:
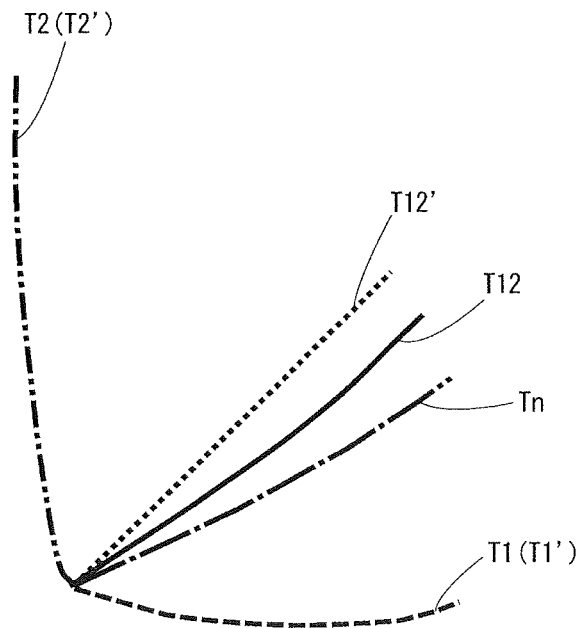
FIG. 13 illustrates one example of a secondary color constituted by two primary colors that are target of the secondary-color correction processing according to the one embodiment.

FIG. 13 illustrates one example of the secondary color constituted of two primary colors, which are the target of the secondary-color correction processing.

FIG. 13 illustrates an ab diagram in the Lab color space. As illustrated in FIG. 13, assume that respective defined values of used amounts of the color materials of the two primary colors, which are the target of the secondary-color correction processing, in the solid print density (the print density at the input color value 100%) are T1 and T2, and assume that the defined value of the used amount of the color material of the secondary color that is constituted by combining the two primary colors, which are the target of the secondary-color correction processing, by the equal amount, in the solid print density, is T12. Then, T12 can be expressed as $\alpha$ (T1+T2) by using $\alpha$, which is a numerical value larger than 0 and smaller than 1.

When any of the solid-print-density holding rates Vt of the two primary colors, which are the target of the secondary-color correction processing, is smaller than 1, a hue angle of the secondary color that is constituted by combining the two primary colors, which are the target of the secondary-color correction processing, by the equal amount sometimes deviates from T12. Specifically, the hue angle of the secondary color that is constituted by combining the two primary colors, which are the target of the secondary-color correction processing, by the equal amount, deviates to the hue angle side where the solid-print-density holding rate Vt is larger, of the two primary colors, which are the target of the secondary-color correction processing. For example, when the used amounts of the color materials of the two primary colors, which are the target of the secondary-color correction processing, in the solid print density are T1' and T2' from the smaller side of the solid-print-density holding rate Vt, a hue angle in a used amount T12' of the color material of the secondary color that is constituted by combining the two primary colors, which are the target of the secondary-color correction processing, by the equal amount, in the solid print density deviates to the hue angle side in the case of T2', as illustrated in FIG. 13. Then, T12' can be expressed as $\alpha$ (T1'+T2') by using $\alpha$ described above.

Here, assume Tn where the hue angle in the case of T12' is moved to the hue angle side in the case of T1'. To move the hue angle in the case of T12' to the hue angle side in the case of T1', it is only necessary to reduce the influence of T2', and thus, it is only necessary to set Tn to $\alpha$ (T1'+$\beta$T2') using $\beta$ that is a numerical value larger than 0 and smaller than 1. Setting $\beta$ to an appropriate numerical value enables matching the hue angle in the case of Tn to the hue angle in the case of T12.

Consequently, when in the two primary colors, which are the target of the secondary-color correction processing, the used amount of the color material of the primary color corresponding to the forward solid-print-density holding rate Vt in the order arranged at Step S232, in the solid print density is T1', and the used amount of the color material of the primary color corresponding to the rearward solid-print-density holding rate Vt in the order arranged at Step S232, in the solid print density is T2', the patces included in the adjustment-patch region of the secondary-color chart are, for example, by considering the five kinds of 0.9, 0.925, 0.95, 0.975, and 1 as $\beta$, the patches of 64 tones with $\alpha$ of $\alpha$ (T1'+0.9×T2') changed, the patches of 64 tones with $\alpha$ of $\alpha$ (T1'+0.925×T2') changed, the patches of 64 tones with $\alpha$ of $\alpha$ (T1'+0.95×T2') changed, the patches of 64 tones with $\alpha$ of $\alpha$ (T1'+0.975×T2') changed, and the patches of 64 tones with $\alpha$ of $\alpha$ (T1'+T2') changed, which are each arranged in random number by six-times worth. In this case, the secondary-color chart needs 1920 patches. Since one page can include 522 patches as described above, it is necessary to constitute the secondary-color chart with four or more pages.

As illustrated in FIG. 12, after the process at Step S261, the secondary-color-input-output-characteristics adjustment unit 28b prints the secondary-color chart with the printer 24 based on the print data generated at Step S261 (Step S262).

When the secondary-color chart is printed at Step S262, a user causes the color-measurement device 40 to measure each color of the plurality of patches included in the secondary-color chart printed at Step S262.

Accordingly, the calibration unit 35a in the computer 30 executes the operations illustrated in FIG. 8.

As illustrated in FIG. 8, the calibration unit 35a executes the processes at Steps S161 to S166 described above.

When the calibration unit 35a determines that the chart is not the primary-color chart, namely, the chart is determined to be the secondary-color chart at Step S166, the calibration unit 35a executes secondary-color-correction-value arithmetic processing that operates a correction value for correcting the input-output characteristics of the secondary color (Step S171).

Figure 14:
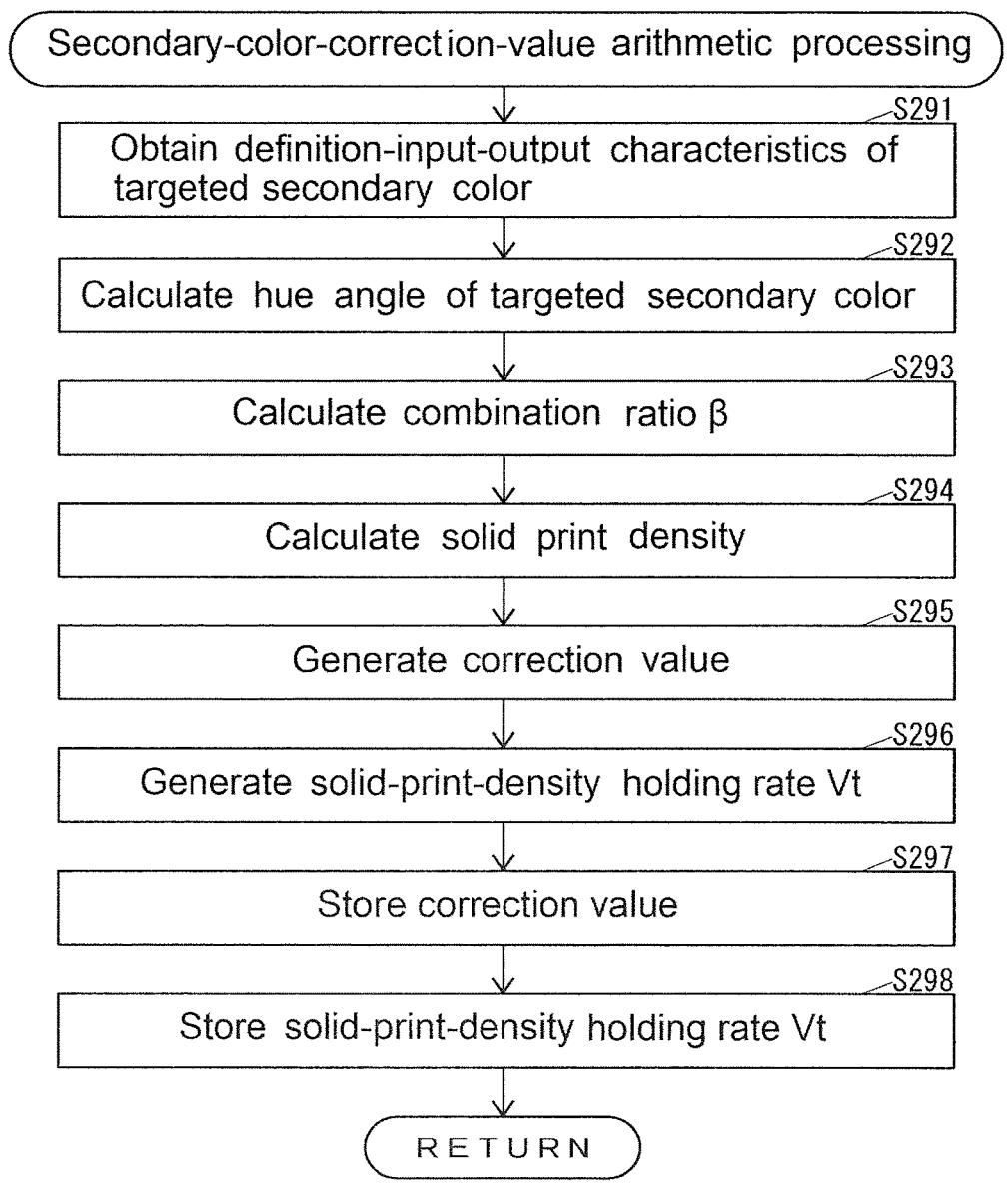
FIG. 14 illustrates secondary-color-correction-value arithmetic processing according to the one embodiment.

FIG. 14 illustrates the secondary-color-correction-value arithmetic processing illustrated in in FIG. 8.

As illustrated in FIG. 14, the calibration unit 35a obtains the definition-input-output characteristics of the secondary color constituted by combining the two primary colors, which are the target of the secondary-color-correction-value arithmetic processing, by the equal amount from the storage unit 34 or an external computer (Step S291).

Subsequently, the calibration unit 35a obtains a hue angle Htd of the output color value in the definition-input-output characteristics obtained at Step S291 by calculation (Step S292). Here, the calibration unit 35a obtains a hue angle of a peak value of the output color value of the input-output characteristics obtained at Step S291, namely, the output color value with maximum saturation as the hue angle Htd.

After the process at Step S292, the calibration unit 35a obtains a combination ratio β where the hue angle becomes equal to Htd by ratio arithmetic, based on total results at Step S165 (Step S293). That is, among α (T1'+0.9×T2'), α (T1'+0.925×T2'), α (T1'+0.95×T2'), α (T1'+0.975×T2'), and α (T1'+T2'), the calibration unit 35a specifies two of them the hue angles of which sandwich Htd, and then calculates β, from the ratio of the difference between one hue angle of the specified two of them and Htd and the difference between the other hue angle of the specified two of them and Htd. For example, when the specified two of them are α (T1'+0.975×T2') and α (T1'+T2'), and the ratio of the difference between the hue angle of α (T1'+0.975×T2') and Htd, and the difference between the hue angle of α (T1'+T2') and Htd is 3:2, the calibration unit 35a sets 0.975+(1−0.975)×3/(3+2), namely, 0.99 as β.

After the process at Step S293, when in the two primary colors, which are the target of the secondary-color-correction-value arithmetic processing, assume that the measured color value relative to the input color value 100% of the primary color whose the solid-print-density holding rate Vt is larger is Amt3, the calibration unit 35a obtains a solid print density Amt4 that satisfies β=(Tw−Amt4)/(Tw−Amt3) (Step S294). Then, similarly to the process at Step S207, the calibration unit 35a generates a correction value for correcting the input-output characteristics obtained from the measured color value to the input-output characteristics, which is assumed that the definition-input-output characteristics 34c is changed such that the output color value relative to the input color value 100% is set to Amt4 from Art, with the output color value relative to the input color value 0% being kept at Tw (Step S295). Subsequently, the calibration unit 35a generates the solid-print-density holding rate Vt, namely, {(Tw−Amt4)/(Tw−Art)} (Step S296).

The calibration unit 35a stores the correction value generated at Step S295 in the storage unit 34 as the correction value for the gamma correction table 27b of the targeted color material, namely, in the two primary colors, which are the target of the secondary-color-correction-value arithmetic processing, the color material where the solid-print-density holding rate Vt is larger (Step S297), and stores the solid-print-density holding rate Vt generated at Step S296 in the storage unit 34 as the solid-print-density holding rate Vt of the gamma correction table 27b of the targeted color material (Step S298).

As illustrated in FIG. 8, after executing the secondary-color-correction-value arithmetic processing at Step S171, the calibration unit 35a transmits secondary-color correction data, which indicates the correction value stored in the storage unit 34 at Step S297 and the solid-print-density holding rate Vt stored in the storage unit 34 at Step S298, to the MFP 20 specified by the machine information obtained at Step S163 (Step S172), and then, terminates the operations illustrated in FIG. 8.

As illustrated in FIG. 11, the secondary-color-input-output-characteristics adjustment unit 28b selects the color material corresponding to the first smallest solid-print-density holding rate Vt among the solid-print-density holding rates Vt of the color materials other than black, namely, the first solid-print-density holding rate Vt from the beginning in the order arranged at Step S232, and selects the color material corresponding to the third smallest solid-print-density holding rate Vt, namely, the third solid-print-density holding rate Vt from the beginning in the order arranged at Step S232 (Step S236), and then executes the secondary-color correction processing (see FIG. 12) that corrects the input-output characteristics of the secondary color constituted of the two color materials selected at Step S236 (Step S237).

Subsequently, the secondary-color-input-output-characteristics adjustment unit 28b selects the color material corresponding to the second smallest solid-print-density holding rate Vt among the solid-print-density holding rates Vt of the color materials other than black, namely, the second solid-print-density holding rate Vt from the beginning in the order arranged at Step S232, and selects the color material corresponding to the third smallest solid-print-density holding rate Vt, namely, the third solid-print-density holding rate Vt from the beginning in the order arranged at Step S232 (Step S238), executes the secondary-color correction processing (see FIG. 12) that corrects the input-output characteristics of the secondary color constituted of the two color materials selected at Step S238 (Step S239), and then terminates the operations illustrated in FIG. 11.

As described above, after adjusting the input-output characteristics of the primary color of the MFP 20 by correcting the gamma correction table 27b for the primary color (Step S101), the calibration system 10, as a combination ratio of two color materials that constitute a specific secondary color, obtains the combination ratio where the hue angle of the secondary color becomes the defined hue angle and adjusts the input-output characteristics of the secondary color of the MFP 20 (Step S102) by correcting the gamma correction table 27b for the primary color corresponding to the obtained combination ratio (Steps S261 to S264). Thus, this ensures reducing a data amount to use and eliminating necessity to use a complicate calculation formula, for adjusting the input-output characteristics of the MFP 20. Consequently, the calibration system 10 ensures the reduced cost of a calculation amount.

Since adjusting the input-output characteristics of the secondary color by prioritizing hue that significantly affects color evaluation among hue, lightness, and saturation, the calibration system 10 ensures the reduced difference between a color in user's recognition and an actually printed color.

The calibration system 10 corrects the gamma correction table 27b for the primary color corresponding to the combination ratio of the color materials where the hue angle of the secondary color, which is constituted by combining two color materials by the equal amount, becomes the defined hue angle (Steps S261 to S264). Therefore, the calibration system 10 adjusts the input-output characteristics of the primary color and then adjusts the input-output characteristics of the secondary color approximately equally apart from each of the two primary colors in the hue angle, after, the calibration system 10 ensures the reduced difference between the color in user's recognition and the actually printed color in a well-balanced manner with respect to the whole region of the color space.

The calibration system 10 may correct the gamma correction table 27b for the primary color corresponding to the combination ratio of the color materials where the hue angle of the secondary color other than the secondary color that is constituted by combining two color materials by the equal amount becomes the defined hue angle.

While in the calibration system 10 the processes are shared and executed by the MFP 20 and the computer 30 and since the information to access the MFP 20 is included in the chart, execution results of the processes by the computer 30 can be easily transmitted to the MFP 20 from the computer 30. Therefore, the calibration system 10 ensures the improved convenience. It is only necessary that the information to access the MFP 20 is included in the chart by at least one of the primary-color-input-output-characteristics adjustment unit 28a and the secondary-color-input-output-characteristics adjustment unit 28b.

When the user manually transmits the execution results of the processes by the computer 30 to the MFP 20 from the computer 30, it is not necessary that the calibration system 10 includes the information to access the MFP 20 in the chart.

In the calibration system 10, the MFP 20 may individually execute all the processes without including the computer 30.

While the image forming apparatus of the disclosure is the MFP in the embodiment, an image forming apparatus other than an MFP, such as a printer-only machine, may be applicable.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A calibration system comprising:
    an image forming apparatus that performs printing with a gamma correction table; and
    a color-measurement device that measures colors on a chart printed by the image forming apparatus,
    the image forming apparatus comprising:
    a Central Processing Unit (CPU); and
    a non-volatile storage device that stores a calibration program for adjusting input-output characteristics of the image forming apparatus,
    wherein the CPU executes the calibration program to function as:
    a primary-color-input-output-characteristics adjustment unit that adjusts input-output characteristics of a primary color of the image forming apparatus by correcting the gamma correction table for the primary color using measurement results of the chart for the primary color, the measurement results being measured by the color-measurement device; and
    a secondary-color-input-output-characteristics adjustment unit that adjusts input-output characteristics of a secondary color of the image forming apparatus by correcting the gamma correction table for the primary color using the measurement results of the chart for the secondary color, the measurement results being measured by the color-measurement device, the chart for the secondary color being printed by the image forming apparatus after the adjustment of the input-output characteristics of the primary color by the primary-color-input-output-characteristics adjustment unit,
    wherein the secondary-color-input-output-characteristics adjustment unit, as a combination ratio of two color materials that constitute a specific secondary color, obtains the combination ratio where a hue angle of the specific secondary color becomes a defined hue angle so as to correct the gamma correction table for the primary color corresponding to the obtained combination ratio.

2. The calibration system according to claim 1,
    wherein the specific secondary color is a secondary color constituted by combining the two color materials by an equal amount by definition.

3. The calibration system according to claim 1,
    wherein at least one of the primary-color-input-output-characteristics adjustment unit and the secondary-color-input-output-characteristics adjustment unit includes information to access the image forming apparatus in the chart.

4. A calibration method using an image forming apparatus for printing using a gamma correction table and a color-measurement device for measuring colors on a chart printed by the image forming apparatus, the calibration method comprising:
    adjusting input-output characteristics of a primary color of the image forming apparatus by correcting the gamma correction table for the primary color using measurement results of the chart for the primary color, the measurement results being measured by the color-measurement device; and
    adjusting input-output characteristics of a secondary color of the image forming apparatus by correcting the gamma correction table for the primary color using the measurement results of the chart for the secondary color, the measurement results being measured by the color-measurement device, the chart for the secondary color being printed by the image forming apparatus after the adjustment of the input-output characteristics of the primary color by the adjusting input-output characteristics of the primary color,
    wherein the adjusting input-output characteristics of the secondary color, as a combination ratio of two color materials that constitute a specific secondary color, obtains the combination ratio where a hue angle of the specific secondary color becomes a defined hue angle so as to correct the gamma correction table for the primary color corresponding to the obtained combination ratio.

5. A non-transitory computer-readable recording medium storing a calibration program to control an image forming apparatus that prints using a gamma correction table, the calibration program causing the image forming apparatus to function as:
    a primary-color-input-output-characteristics adjustment unit that adjusts input-output characteristics of a primary color of the image forming apparatus by correcting the gamma correction table for the primary color using measurement results of the chart for the primary color, the measurement results being measured by a color-measurement device that measures colors on a chart printed by the image forming apparatus; and a secondary-color-input-output-characteristics adjustment unit that adjusts input-output characteristics of a secondary color of the image forming apparatus by correcting the gamma correction table for the primary color using the measurement results of the chart for the secondary color, the measurement results being measured by the color-measurement device, the chart for the secondary color being printed by the image forming apparatus after the adjustment of the input-output characteristics of the primary color by the primary-color-input-output-characteristics adjustment unit, wherein the secondary-color-input-output-characteristics adjustment unit, as a combination ratio of two color materials that constitute a specific secondary color, obtains the combination ratio where a hue angle of the specific secondary color becomes a defined hue angle so as to correct the gamma correction table for the primary color corresponding to the obtained combination ratio.

* * * * *